United States Patent
Anand

(10) Patent No.: US 12,531,637 B2
(45) Date of Patent: Jan. 20, 2026

(54) NETWORK PROBING INCLUDING SPLIT LIGHT SIGNAL MONITORING

(71) Applicant: DISH WIRELESS L.L.C., Englewood, CO (US)

(72) Inventor: Sudir Anand, Cincinnati, OH (US)

(73) Assignee: Boost SubscriberCo L.L.C., Englewood, CO (US)

(*) Notice: Subject to any disclaimer, the term of this patent is extended or adjusted under 35 U.S.C. 154(b) by 104 days.

(21) Appl. No.: 17/967,522

(22) Filed: Oct. 17, 2022

(65) Prior Publication Data

US 2024/0129032 A1    Apr. 18, 2024

(51) Int. Cl.
- *H04B 10/2575* (2013.01)
- *G02B 6/125* (2006.01)
- *H04B 10/61* (2013.01)

(52) U.S. Cl.
CPC ....... *H04B 10/25759* (2013.01); *G02B 6/125* (2013.01); *H04B 10/614* (2013.01)

(58) Field of Classification Search
CPC . H04B 10/25759; H04B 10/614; G02B 6/125
See application file for complete search history.

(56) References Cited

U.S. PATENT DOCUMENTS

| | | | | |
|---|---|---|---|---|
| 10,187,172 | B2* | 1/2019 | Nakagawa | H04J 14/0256 |
| 10,900,866 | B2* | 1/2021 | Baribault | G02B 6/385 |
| 2005/0132044 | A1* | 6/2005 | Guingo | H04L 41/5009 709/225 |
| 2005/0213965 | A1* | 9/2005 | Bergmann | H04B 10/07 398/16 |
| 2006/0092404 | A1* | 5/2006 | Weller | G01N 21/00 356/73.1 |
| 2017/0005723 | A1* | 1/2017 | Prause | H04B 10/07 |
| 2017/0141845 | A1* | 5/2017 | Totten | H04N 21/6168 |
| 2017/0339706 | A1* | 11/2017 | Andreoli-Fang | H04W 72/51 |
| 2018/0048948 | A1* | 2/2018 | Tom | H04Q 11/0062 |
| 2018/0212706 | A1* | 7/2018 | Ghuman | H04J 14/0204 |
| 2018/0367790 | A1* | 12/2018 | Walsh | H04B 10/25751 |
| 2018/0375574 | A1* | 12/2018 | Eddy | G02B 6/4286 |
| 2019/0379443 | A1* | 12/2019 | Pyun | H04W 88/04 |
| 2019/0391041 | A1* | 12/2019 | Baribault | G01M 11/088 |
| 2020/0381889 | A1* | 12/2020 | Suehiro | H01S 5/06825 |
| 2022/0376810 | A1* | 11/2022 | Ghuman | H04J 14/0271 |
| 2022/0416894 | A1* | 12/2022 | Cho | H04L 7/04 |
| 2023/0094895 | A1* | 3/2023 | Harada | H04J 14/02 398/72 |
| 2024/0063907 | A1* | 2/2024 | Ito | H04B 10/516 |

* cited by examiner

*Primary Examiner* — Pranesh K Barua
(74) *Attorney, Agent, or Firm* — Seed Intellectual Property Law Group LLP

(57) ABSTRACT

A virtual cell site router, including a first module configured to receive an optical signal from a distributed unit and an optical splitter. The optical splitter can split the optical signal into a first part and one or more second parts. The first part of the signal is directed towards a unit, and the one or more second parts of the signal is directed toward one or more modules configured to monitor an aspect of the network.

13 Claims, 9 Drawing Sheets

NETWORK PROBING INCLUDING SPLIT LIGHT SIGNAL MONITORING

BACKGROUND

Reliability is an important aspect of telecommunications, as users seek a consistent experience with high speed, low lag, and minimal errors. In many complex software-based systems, telecommunications included, there are many unknowns that are difficult or otherwise inefficient to prepare for. Accordingly, an observability framework to observe functioning of the software and allow for appropriate monitoring is desirable. In particular, in order to make best use of a system, a configuration where one could feasibly see an issue present itself outside of the cloud, where the issue can be observed and control information between two people talking, sharing messages and the like can be observed can lead to a more efficient and cost-effective resolution of such problems in the future.

SUMMARY

Where to provide a framework for observability has been an issue for telecommunications engineers. In solutions such as a 5G-cloud based solution, where some of the telecommunications software is hosted on a public cloud, observability within the public cloud domain can be complicated, expensive, and may not be well-utilized. Efforts to leverage where a provider can reduce cost of cloud-based CPUs for observability and monitoring while still achieving the desired observability and monitoring are desired.

According to some embodiments, a framework for observability utilizing hardware and software within privately owned components is contemplated. The framework includes split-light signal monitoring that allows for a light signal to be furcated to multiple host computers, improving the versatility of information gathering, and observability generally.

For example, according to one embodiment, disclosed is a virtual cell site router. The virtual cell site router includes an input configured to receive an optical signal from a first unit, and an optical splitter. The optical splitter is configured to split the optical signal into a first part and one or more second parts. In some embodiments, the first part of the signal is directed towards a central unit, and the second part of the signal is directed toward a one or more modules configured to monitor an aspect of the network.

According to one embodiment, disclosed is a system including at least one radio unit, at least one distributed unit configured to receive an optical signal from the at least one distributed unit, and a virtual cell site router configured to receive the optical signal from the at least one distributed unit or from a central unit. The virtual cell site router includes an optical splitter configured to split the optical signal into a first part and one or more second parts, whereby the first part of the optical signal is directed towards a central unit or a distributed unit, and the one or more second parts of the signal is directed toward an observability module configured to monitor an aspect of the network.

According to one embodiment, disclosed is a method for network probing including receiving an optical signal, splitting the optical signal into a first part and one or more second parts. The first part of the signal is directed to a component providing primary network functions, and the second part of the signal is directed to an observability module.

DETAILED DESCRIPTION OF EMBODIMENTS

Figure 1:
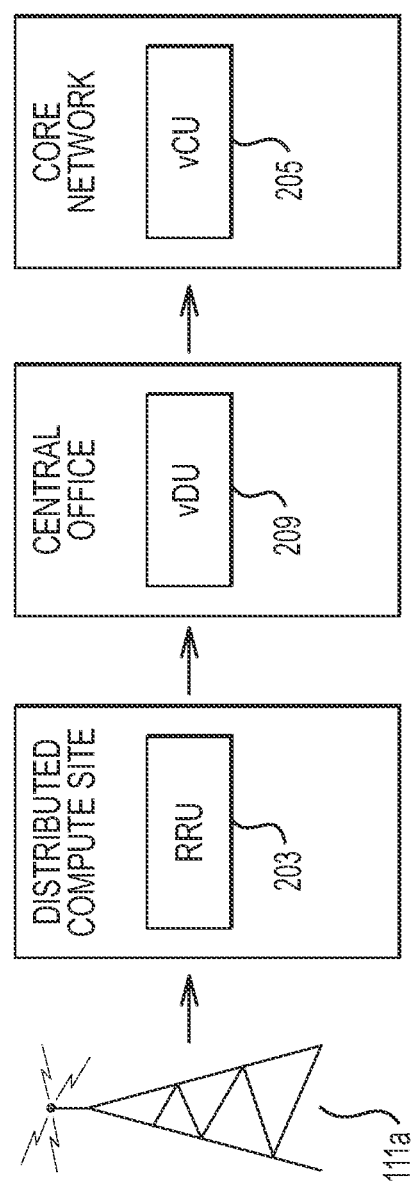
FIG. 1 illustrates a high level block diagram showing a 5G cellular network using vDUs and a vCU.

The present application describes various embodiments allowing for observability of a telecommunications network utilizing splitting of an optical signal. With the above overview in mind, the following description sets forth numerous specific details in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings.

An architecture according to some embodiments includes a system to coordinate workloads in a cellular network, such as a 5G cellular network. The system may include some components that are hosted within a public cloud space, while other components may be hosted privately (e.g., by the provider of the cellular communication service). Accordingly, the architecture may be considered a 5G cloud-based architecture, with at least some components hosted within a public cloud space.

An exemplary 5G architecture is described herein with reference to FIGS. 1-6. However, it should be understood that embodiments of the instant application are not specifically limited to a 5G architecture, let alone a 5G cloud-based architecture. For example, embodiments of the instant application may also be utilized in other cellular networks, such as 2G, 3G, 4G LTE and 4G. Further, embodiments of the instant application may be applicable in an architecture with all components hosted locally, and/or on a private cloud space, provided they share similar structures capable of fiberoptic signal transmission. The other purpose of this method is to ensure absolute total "non drop rate" single optical signal to multiple total optical signals from the data line (via optical feeds) using in-line optics to transfer data without getting impaired by any queue or capacity limits that gets delivered to the downstream infrastructure used by probing platforms at VM or Cloud Native clusters.

Establishing a Cellular Network Using Kubernetes Clusters

First, the kubernetes cluster configuration is discussed below.

A kubernetes cluster is a set of nodes that run containerized applications. Containerizing applications is an operating system-level virtualization method used to deploy and run distributed applications without launching an entire virtual machine (VM) for each application.

A cluster configuration software is available at a cluster configuration server. This guides a user, such as system administrator, through a series of software modules for configuring hosts of a cluster by defining features and matching hosts with requirements of features so as to enable usage of the features in the cluster. The software automatically mines available hosts, matches host with features requirements, and selects the hosts based on host-feature compatibility. The selected hosts are configured with appropriate cluster settings defined in a configuration template to be part of the cluster. The resulting cluster configuration provides an optimal cluster of hosts that are all compatible with one another and allows usage of various features. Additional benefits can be realized based on the following detailed description.

The present application uses such kubernetes clusters to deploy a RAN (radio access network) so that the vDU (a virtualized distributed unit) of the RAN is located at one kubernetes cluster and a vCU (virtualized central unit) is located at a remote location from the vDU. This configuration allows for a more stable and flexible configuration for the RAN.

The RAN includes a tower, radio unit (RU), distributed unit (DU), central unit (CU), and an element management system (EMS). FIG. 1 illustrates a system that delivers full RAN functionality using network functions virtualization (NFV) infrastructure. This approach decouples baseband functions from the underlying hardware and creates a software fabric. Within the solution architecture, virtualized baseband units (vBBU) process and dynamically allocate resources to remote radio units (RRUs such as RRU 203) based on the current network needs. Baseband functions are split between central units (CUs or vCUs (virtualized central units)) and distributed units (DUs or vDUs (virtualized distributed units) that can be deployed in aggregation centers or in central offices using a distributed architecture, such as using kubernetes clusters as discussed herein.

Virtualized CUs and DUs (such as vCU 205 and vDU 209, which is described in more detail with reference to FIG. 2) run as virtual network functions (VNFs) within the NFV infrastructure. The entire software stack that is needed is provided for NFV, including open source software. This software stack and distributed architecture increases interoperability, reliability, performance, manageability, and security across the NFV environment.

RAN standards require deterministic, low-latency, and low-jitter signal processing. These are achieved using kubernetes clusters to control each RAN. Moreover, the RAN may support different network topologies, allowing the system to choose the location and connectivity of all network components. Thus, the system allowing various DUs on kubernetes clusters allows the network to pool resources across multiple cell sites, scale capacity based on conditions, and ease support and maintenance requirements.

Figure 2:
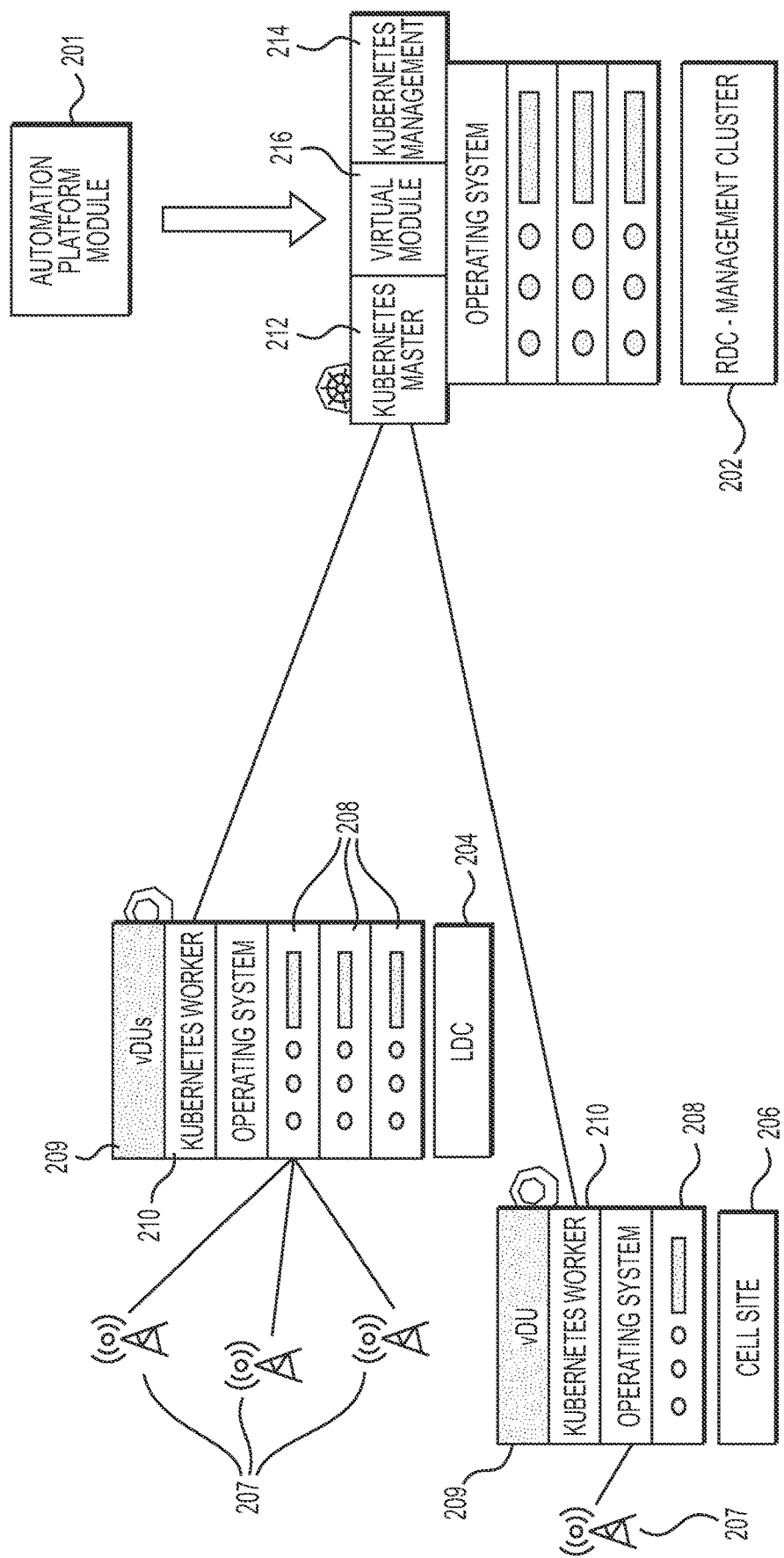
FIG. 2 illustrates a high level block diagram showing 5G cellular network with kubernetes clusters.

FIG. 2 illustrates an exemplary system used in constructing clusters that allows a network to control cell sites, in one embodiment of the invention. The system includes a cluster configuration server that can be used by a cell site to provide various containers for processing of various functions. Each of the cell sites are accessed by the client devices, which may be any computing device which has cellular capabilities, such as a mobile phone, computer or other computing device.

As shown, the system includes an automation platform (AP) module 201, a remote data center (RDC) 202, one or more local data centers (LDC) 204 (204', 204"), and one or more cell sites 206 (206', 206").

The cell sites 206 provide cellular service to the client devices through the use of at least one vDU 209, server 208, and a tower 207. The server 208 at a cell site 206 controls the vDU 209 located at the cell site 206, which in turn controls communications to the tower 207. Each vDU 209 is software to control the communications with the towers 207, and RRUs so that communications from client devices can communicate from one tower through the kubernetes clusters at the CU and to the 5G Core. In other words, the voice and data from a cellular mobile client device connects to the towers and then goes through the vDU 209 to transmit such voice and data to the CU and through to the 5G Core. From there, the data or voice traffic can relay to off the network or to voice and data to another tower 207.

The server(s) on each individual cell site 206 or LDC 204 may not have enough computing power to run a control plane that supports the functions in the mobile telecommunications system to establish and maintain the user plane. As such, the control plane is then run in a location that is remote from the cell sites 206, such as the RDC.

The RDC 202 is the management cluster which manages the LDC 204 and a plurality of cell sites 206. As mentioned above, the control plane may be deployed in the RDC 202. The control plane maintains the logic and workloads in the cell sites from the RDC 202 while each of the kubernetes containers is deployed at the cell sites 206. The control plane also monitors whether the workloads are running properly and efficiently in the cell sites 206 and may allow for fixing of any workload failures. If the control plane determines that a workload fails at the cell site 206, for example, the control plane redeploys the workload on the cell site 206.

The RDC 202 may include a kubernetes master 212 (or kubernetes master module), a kubernetes management module 214 and a virtual (or virtualization) module 216. The master module 212 monitors and controls the kubernetes workers 210 and the applications running thereon, such as the vDUs 209. If a vDU 209 fails, the master module 212 recognizes this, and will redeploy the vDU 209 automatically. In this regard, the kubernetes clusters system has intelligence to maintain the configuration, architecture and stability of the applications running. In this regard, the kubernetes clusters system may be considered to be "self-healing".

The management module 214 along with the automation platform module 201 creates the kubernetes clusters in the LDCs 204 and cell sites 206.

For each of the servers in the LDC 204 and the cell sites 206, an operating system is loaded in order to run the kubernetes workers 210. For example, such software could be ESXi and Photon OS. The vDUs are also software, as mentioned above, that runs on the kubernetes workers 210. In this regard, the software layers are the operating system, and then the kubernetes workers 210, and then the vDUs 209.

The automation platform module 201 includes a GUI that allows a user to initiate kubernetes clusters. The automation platform module 201 communicates with the management module 214 so that the management module 214 creates the kubernetes clusters and a master module 212 for each cluster.

Prior to creating each of the clusters, the virtualization center 216 module creates a virtual machine (VM) so that the kubernetes clusters can be created. VMs and containers are integral parts of the kubernetes infrastructure of data centers and cell sites. VMs are emulations of particular computer systems that operate based on the functions and computer architecture of real or hypothetical computers. A VM is equipped with a full server hardware stack that has been virtualized. Thus, a VM includes virtualized network adapters, virtualized storage, a virtualized CPU, and a virtualized BIOS. Since VMs include a full hardware stack, each VM requires a complete operating system (OS) to function, and VM instantiation thus requires booting a full OS.

In addition to VMs, which provide abstraction at the physical hardware level (e.g., by virtualizing the entire server hardware stack), containers are created on top of the VMs. Containers provide abstraction at the OS level. In most container systems, the user space is also abstracted. A typical example is application presentation systems such as from Citrix applications. Citrix's applications create a segmented user space for each instance of an application. Citrix's applications may be used, for example, to deploy an office suite to dozens or thousands of remote workers. In doing so, Citrix's applications create sandboxed user spaces on a Windows Server for each connected user. While each user shares the same operating system instance including kernel, network connection, and base file system, each instance of the office suite has a separate user space.

In any event, once the VMs and containers are created, the master modules 212 then create a vDU 209 for each VM.

The LDC 204 is a data center that can support multiple servers and multiple towers for cellular communications. The LDC 204 is similar to the cell sites 206 except that each LDC has multiple servers and multiple towers 207. Each server in the LDC 204 (as compared with the server in each cell site 206) may support multiple towers. The server in the LDC may be different from the server in the cell site 206 because the servers in the LDC are larger in memory and processing power (number of cores, etc.) relative to the servers in the individual cell sites 206. In this regard, each server in the LDC may run multiple vDUs (e.g., 2), where each of these vDUs independently operates a cell tower 207. Thus, multiple towers 207 can be operated through the LDCs 204 using multiple vDUs using the kubernetes clusters. The LDCs 204 may be placed in bigger metropolitan areas whereas individual cell sites 206 may be placed at smaller population areas.

Figure 3:
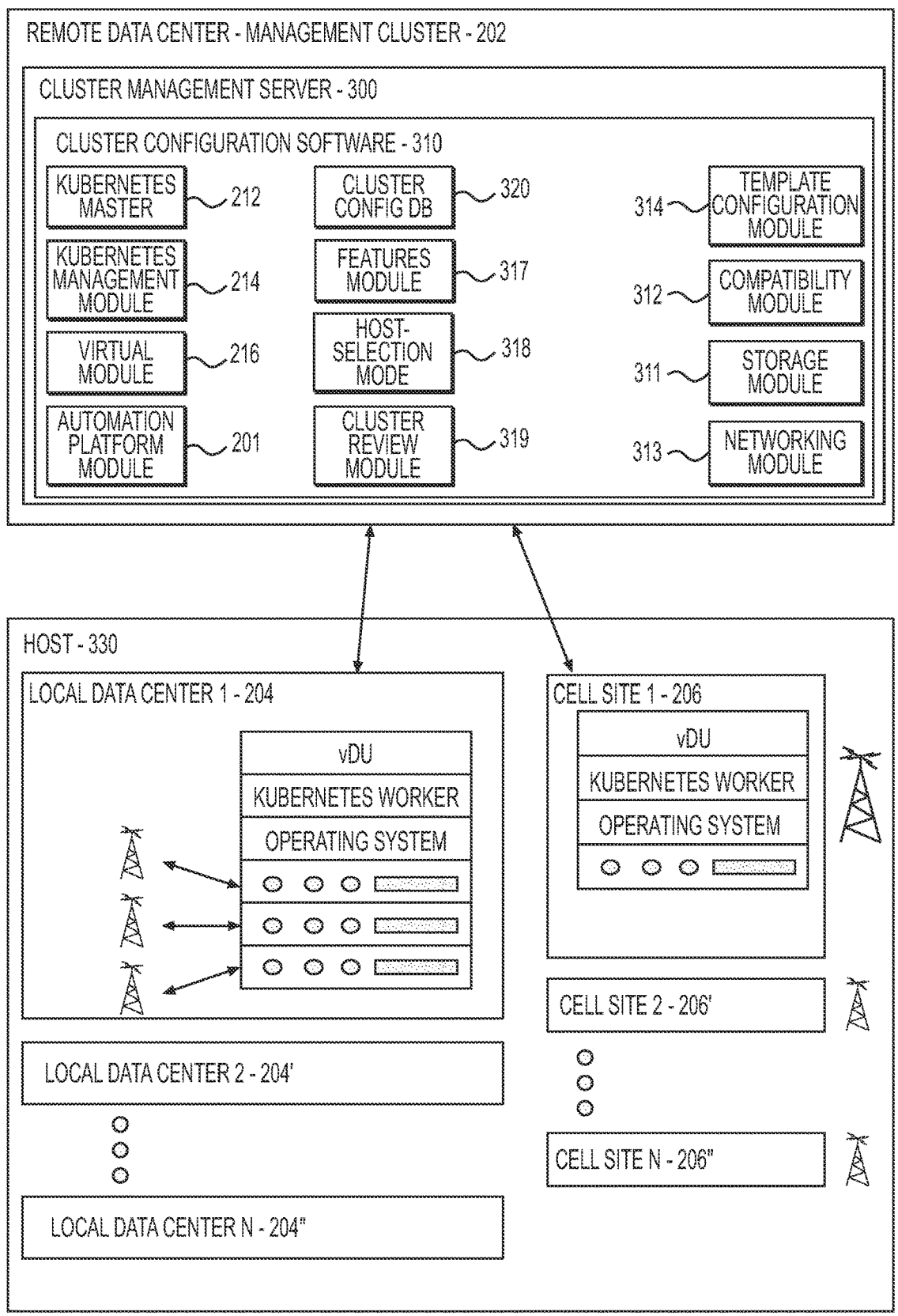
FIG. 3 illustrates a block diagram of the system of FIG. 2 but further illustrating details of cluster configuration software, according to various embodiments.

FIG. 3 illustrates a block diagram of the system of FIG. 2 but further illustrating details of cluster configuration software, according to various embodiments.

As illustrated, a cluster management server 300 is configured to run the cluster configuration software 310. The cluster configuration software 310 runs using computing resources of the cluster management server 300. The cluster management server 300 is configured to access a cluster configuration database 320. In one embodiment, the cluster configuration database 320 includes a host list with data related to a plurality of hosts 330 including information associated with hosts, such as host capabilities. For instance, the host data may include list of hosts 330 accessed and managed by the cluster management server 300, and for each host 330, a list of resources defining the respective host's capabilities. Alternately, the host data may include a list of every host in the entire virtual environment and the corresponding resources or may include only the hosts that are currently part of an existing cluster and the corresponding resources. In an alternate embodiment, the host list is maintained on a server that manages the entire virtual environment and is made available to the cluster management server 300.

In addition to the data related to hosts 330, the cluster configuration database 320 includes features list with data related to one or more features including a list of features and information associated with each of the features. The information related to the features include license information corresponding to each feature for which rights have been obtained for the hosts, and a list of requirements associated with each feature. The list of features may include, for example and without limitations, live migration, high availability, fault tolerance, distributed resource scheduling, etc. The list of requirements associated with each feature may include, for example, host name, networking and storage requirements. Information associated with features and hosts are obtained during installation procedure of respective components prior to receiving a request for forming a cluster.

Each host is associated with a local storage and is configured to support the corresponding containers running on the host. Thus, the host data may also include details of containers that are configured to be accessed and managed by each of the hosts 330. The cluster management server 300 is also configured to access one or more shared storage and one or more shared network.

The cluster configuration software 310 includes one or more modules to identify hosts and features and manage host-feature compatibility during cluster configuration. The configuration software 310 includes a compatibility module 312 that retrieves a host list and a features list from the configuration database 320 when a request for cluster construction is received from the client. The compatibility module 312 checks for host-feature compatibility by executing a compatibility analysis which matches the feature requirements in the features list with the hosts capabilities from the host list and determines if sufficient compatibility exists for the hosts in the host list with the advanced features in the features list to enable a cluster to be configured that can utilize the advanced features. Some of the compatibilities that may be matched include hardware, software and licenses.

It should be noted that the aforementioned list of compatibilities are exemplary and should not be construed to be limiting. For instance, for a particular advanced feature, such as fault tolerance, the compatibility module checks whether the hosts provide a compatible processor family, host operating system, Hardware Virtualization enabled in the BIOS, and so forth, and whether appropriate licenses have been obtained for operation of the same. Additionally, the compatibility module 312 checks to determine if networking and storage requirements for each host in the cluster configuration database 320 are compatible for the selected features or whether the networking and storage requirements may be configured to make them compatible for the selected features. In one embodiment, the compatibility module checks for basic network requirements. This might entail verifying each host's connection speed and the subnet to determine if each of the hosts has the required speed connection and access to the right subnet to take advantage of the selected features. The networking and storage requirements are captured in the configuration database 320 during installation of networking and storage devices and are used for checking compatibility.

The compatibility module 312 identifies a set of hosts accessible to the management server 300 that either matches the requirements of the features or provides the best match and constructs a configuration template that defines the cluster configuration settings or profile that each host needs to conform to in the configuration database 320. The configuration analysis provides a ranking for each of the identified hosts for the cluster. The analysis also presents a plurality of suggested adjustments to particular hosts so as to make the particular hosts more compatible with the requirements. The compatibility module 312 selects hosts that best match the features for the cluster. The cluster management server 300 uses the configuration settings in the configuration template to configure each of the hosts for the cluster. The configured cluster allows usage of the advanced features during operation and includes hosts that are most compatible with each other and with the selected advanced features.

In addition to the compatibility module 312, the configuration software 310 may include additional modules to aid in the management of the cluster including managing configuration settings within the configuration template, addition/deletion/customization of hosts and to fine-tune an already configured host so as to allow additional advanced features to be used in the cluster. Each of the modules is configured to interact with each other to exchange information during cluster construction. For instance, a template configuration module 314 may be used to construct a configuration template to which each host in a cluster must conform based on specific feature requirements for forming the cluster. The configuration template is forwarded to the compatibility module which uses the template during configuration of the hosts for the cluster. The host configuration template defines cluster settings and includes information related to network settings, storage settings and hardware configuration profile, such as processor type, number of network interface cards (NICs), etc. The cluster settings are determined by the feature requirements and are obtained from the Features list within the configuration database 320.

A configuration display module may be used to return information associated with the cluster configuration to the client for rendering and to provide options for a user to confirm, change or customize any of the presented cluster configuration information. In one embodiment, the cluster configuration information within the configuration template may be grouped in sections. Each section can be accessed to obtain further information regarding cluster configuration contained therein.

A features module 317 may be used for mining features for cluster construction. The features module 317 is configured to provide an interface to enable addition, deletion, and/or customization of one or more features for the cluster. The changes to the features are updated to the features list in the configuration database 320. A host-selection module 318 may be used for mining hosts for cluster configuration. The host-selection module 318 is configured to provide an interface to enable addition, deletion, and/or customization of one or more hosts. The host-selection module 318 is further configured to compare all the available hosts against the feature requirements, rank the hosts based on the level of matching and return the ranked list along with suggested adjustments to a cluster review module 319 for onward transmission to the client for rendering.

The cluster review module 319 may be used to present the user with a proposed configuration returned by the host-selection module 318 for approval or modification. The configuration can be fine-tuned through modifications in appropriate modules during guided configuration set-up which are captured and updated to the host list in either the configuration database 320 or the server. The suggested adjustments may include guided tutorial for particular hosts or particular features. In one embodiment, the ranked list is used in the selection of the most suitable hosts for cluster configuration. For instance, highly ranked hosts or hosts with specific features or hosts that can support specific applications may be selected for cluster configuration. In other embodiments, the hosts are chosen without any consideration for their respective ranks. Hosts can be added or deleted from the current cluster. In one embodiment, after addition or deletion, the hosts are dynamically re-ranked to obtain a new ranked list. The cluster review module 319 provides a tool to analyze various combinations of hosts before selecting the best hosts for the cluster.

A storage module 311 enables selection of storage requirements for the cluster based on the host connectivity and provides an interface for setting up the storage requirements. Shared storage is required in order to take advantage of the advanced features. As a result, one should determine what storage is shared by all hosts in the cluster and use only those storages in the cluster in order to take advantage of the advanced features. The selection options for storage include all the shared storage available to every host in the cluster. The storage interface provides default storage settings based on the host configuration template stored in the configuration database 320 which is, in turn, based on compatibility with prior settings of hosts, networks and advanced features and enables editing of a portion of the default storage settings to take advantage of the advanced features. In one embodiment, if a required storage is available to only a selected number of hosts in the cluster, the storage module will provide necessary user alerts in a user interface with required tutorials on how to go about fixing the storage requirement for the configuration in order to take advantage of the advanced features. The storage module performs edits to the default storage settings based on suggested adjustments. Any updates to the storage settings including a list of selected storage devices available to all hosts of the cluster are stored in the configuration database 320 as primary storage for the cluster during cluster configuration.

A networking module 313 enables selection of network settings that is best suited for the features and provides an interface for setting up the network settings for the cluster. The networking module provides default network settings, including preconfigured virtual switches encompassing several networks, based on the host configuration template stored in the cluster configuration database, enables selecting/editing the default network settings to enter specific network settings that can be applied/transmitted to all hosts, and provides suggested adjustments with guided tutorials for each network options so a user can make informed decisions on the optimal network settings for the cluster to enable usage of the advanced features. The various features and options matching the cluster configuration requirements or selected during network setting configuration are stored in the configuration database and applied to the hosts so that the respective advanced features can be used in the cluster.

FIG. 3 also illustrates cell sites 206 that are configured to be clients of each cluster. Each cell site 206 is shown as includes a cellular tower 207 and a connection to each distributed unit (DU), similar to FIG. 2. Each DU is labeled as a virtualized distributed unit (vDU) 209, similar to FIG. 2, and each vDU runs as virtual network functions (VNFs) within an open source network functions virtualization (NFV) infrastructure.

Figure 4:
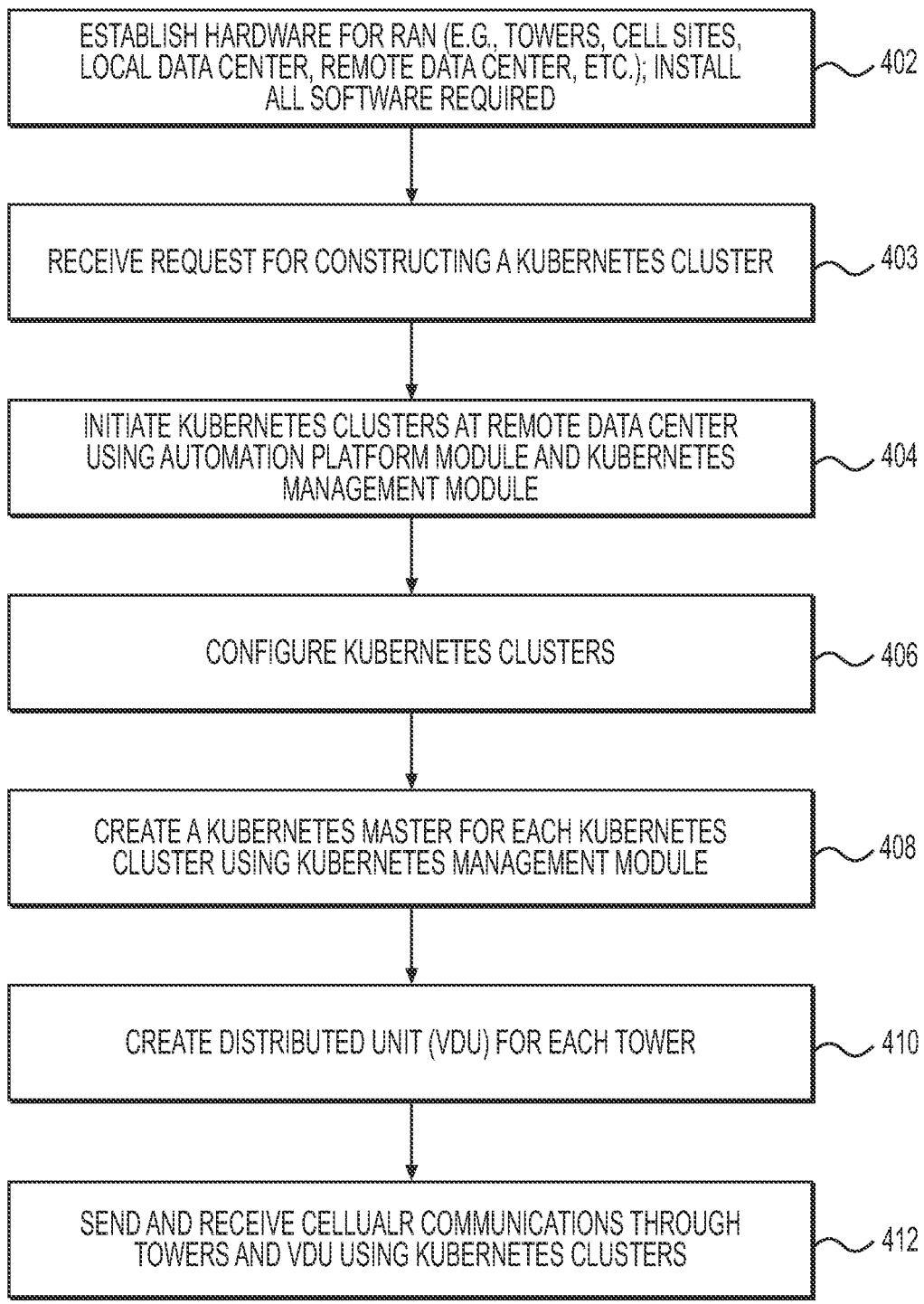
FIG. 4 illustrates a method of establishing cellular communications using kubernetes clusters.

With the above overview of the various components of a system used in the cluster configuration, specific details of how each component is used in establishing and communicating through a cellular network using kubernetes clusters, as shown in FIG. 4.

First, all of the hardware required for establishing a cellular network (e.g., a RAN, which includes towers, RRUs, DUs, CU, etc.) and a kubernetes cluster (e.g., servers, racks, etc.) are provided, as described in block 402. The LDC 204, RDC 202, and cell sites 206 are created and networked together via a network.

In blocks 403-408, the process of constructing a cluster using plurality of hosts will now be described.

The process begins at block 403 with a request for constructing a cluster from a plurality of hosts which support one or more containers. The request is received at the automation platform module 201 from a client. The process of receiving a request for configuring a cluster then triggers initiating the kubernetes clusters at the RDC 202 using the automation platform module 201, as illustrated in block 404.

In block 406, the kubernetes clusters are configured and this process will not be described.

The automation platform module 201 is started by a system administrator or by any other user interested in setting up a cluster. The automation platform module 201 then invokes the cluster configuration software on the server, such as a virtual module server, running cluster configuration software.

The invoking of the cluster configuration software triggers the cluster configuration workflow process at the cluster management server by initiating a compatibility module. Upon receiving the request for constructing a cluster, the compatibility module queries a configuration database available to the management server and retrieves a host list of hosts that are accessible and managed by the management server and a features list of features for forming the cluster. The host list contains all hosts managed by the management server and a list of capabilities of each host. The list of capabilities of each host is obtained during installation of each host. The features list contains all licensed features that have at least a minimum number of host licenses for each licensed feature, a list of requirements, such as host, networking and storage requirements. The features list includes, but is not limited to, live migration, high availability, fault tolerance, distributed resource scheduling. Information in the features list and host list are obtained from an initial installation procedure before cluster configuration and through dynamic updates based on hosts and features added, updated or deleted over time and based on number of licenses available and number of licenses in use.

The compatibility module then checks for the host-feature compatibility by executing a compatibility analysis for each of the hosts. The compatibility analysis compares the capabilities of the hosts in the host list with the features requirements in the features list. Some of the host capability data checked during host-feature compatibility analysis include host operating system and version, host hardware configuration, Basic Input/Output System (BIOS) Feature list and whether power management is enabled in the BIOS, host computer processor family (for example, Intel, AMD, and so forth), number of processors per host, number of cores available per processor, speed of execution per processor, amount of internal RAM per host, shared storage available to the host, type of shared storage, number of paths to shared storage, number of hosts sharing the shared storage, amount of shared storage per host, type of storage adapter, amount of local storage per host, number and speed of network interface devices (NICs) per host. The above list of host capability data verified during compatibility analysis is exemplary and should not be construed as limiting.

Some of the features related data checked during compatibility analysis include determining number of licenses to operate an advanced feature, such as live migration/distributed resource scheduling, number and name of hosts with one or more Gigabit (GB) Network Interface Card/Controller (NIC), list of hosts on same subnet, list of hosts that share same storage, list of hosts in the same processor family, and list of hosts compatible with Enhanced live migration (e.g., VMware Enhanced VMotion) compatibility. The above list of feature related compatibility data is exemplary and should not be construed as limiting.

Based on the host-feature compatibility analysis, the compatibility module determines if there is sufficient host-feature compatibility for hosts included on the host list with the features included on the features list to enable a cluster to be constructed that can enable the features. Thus, for instance, for a particular feature, such as fault tolerance, the compatibility module checks whether the hosts provide hardware, software and license compatibility by determining if the hosts are from a compatible processor family, the hosts operating system, BIOS features enabled, and so forth, and whether there are sufficient licenses for operation of features for each host. The compatibility module also checks to determine whether networking and storage resources in the cluster configuration database for each host is compatible with the feature requirements. Based on the compatibility analysis, the compatibility module generates a ranking of each of the hosts such that the highest ranked hosts are more compatible with the requirements for enabling the features. Using the ranking, the compatibility module assembles a proposed cluster of hosts for cluster construction. In one embodiment, the assembling of hosts for the proposed cluster construction is based on one or more pre-defined rules. The pre-defined rules can be based on the hosts capabilities, feature requirements or both the hosts capabilities and feature requirements. For example, one of the pre-defined rules could be to identify and select all hosts that are compatible with the requirements of the selected features. Another pre-defined rule could be to select a given feature and choosing the largest number of hosts determined by the number of licenses for the given feature based on the compatibility analysis. Yet another rule could be to select features and choosing all hosts whose capabilities satisfy the requirements of the selected features. Another rule could be to obtain compatibility criteria from a user and selecting all features and hosts that meet those criteria. Thus, based on the pre-defined rule, the largest number of hosts that are compatible with the features are selected for forming the cluster.

Based on the compatibility analysis, a host configuration template is constructed to include the configuration information from the proposed cluster configuration of the hosts. A list of configuration settings is defined from the host configuration template associated with the proposed cluster configuration of the hosts, as illustrated in operation 105. Each of the hosts that are compatible will have to conform to this list of cluster configuration settings. The cluster configuration settings may be created by the compatibility module or a template configuration module that is distinct from the compatibility module. The configuration settings include network settings, such as number of NICs, bandwidth for each NIC, etc., storage settings and hardware configuration profile, such as processor type, etc. Along with the configuration settings, the compatibility module presents a plurality of suggested adjustments to particular hosts to enable the particular hosts to become compatible with the requirements. The suggested adjustment may include guided tutorials providing information about the incompatible hosts, and steps to be taken for making the hosts compatible as part of customizing the cluster. The cluster configuration settings from the configuration template are returned for rendering on a user interface associated with the client.

In one embodiment, the user interface is provided as a page. The page is divided into a plurality of sections or page elements with each section providing additional details or tools for confirming or customizing the current cluster.

The configuration settings from a configuration template are then rendered at the user interface on the client in response to the request for cluster configuration. If the rendered configuration settings are acceptable, the information in the configuration template is committed into the configuration database for the cluster and used by the management server for configuring the hosts for the cluster. The selected hosts are compatible with the features and with each other. Configuration of hosts may include transmitting storage and network settings from the host configuration template to each of the hosts in the cluster, which is then applied to the hosts. The application of the configuration settings including network settings to the hosts may be done through a software module available at the hosts, in one embodiment of the invention. In one embodiment, a final report providing an overview of the hosts and the cluster configuration features may be generated and rendered at the client after applying the settings from the configuration template. The cluster configuration workflow concludes after successful cluster construction with the hosts.

The cluster creation process further includes creating master modules for each of the clustered being created, as provided in block 408. This is because each master module controls and monitors performance of the respective cluster. Also, in block 410, the vDUs are also installed over the kubernetes workers. In this regard, the vDUs are installed to communicate with a tower and a respective RRU.

Once the clusters are created, communication between the clusters in the data centers occurs through the towers and vDUs using the kubernetes clusters, as provided in block 412. In this regard, communication is facilitated and monitored using the master modules 212. In this regard, the clusters include containers running on the kubernetes clusters and the vDUs are running in the containers. In this regard, when voice and data that is received through a tower is received through the RRU and vDU, they are then communicated through the kubernetes network and then routed to a corresponding location it is addressed to.

In this regard, a 5G network can be established using kubernetes clusters which is more stable and managed more effectively than previous systems. Workloads of clusters can be managed by the master modules so that any processing that is high on one server can be distributed to other servers over the kubernetes clusters. This is performed using the master module which is continuously and automatically monitoring the workloads and health of all of the vDUs.

Stretching the Kubernetes Clusters

In some embodiments, kubernetes clusters are used in 5G to stretch a private cloud network to/from a public cloud network. Each of the kubernetes workload clusters in a private network is controlled by master nodes and support functions (e.g. MTCIL) that are run in the public cloud network.

Also, a virtualization platform runs the core and software across multiple geographic availability zones. A data center within the public network/cloud 502 stretches across multiple availability zones ("AZs") in a public network to host: (1) stack management and automation solutions (e.g. the automation platform module, the virtual module, etc.) and (2) kubernetes cluster management module and the control plane for the RAN clusters. If one of the availability zones fails, another of the availability zones takes over, thereby reducing outages. More details are presented below of this concept.

A private network (sometimes referred to as a data center) resides on a company's own infrastructure, and is typically firewall protected and physically secured. An organization may create a private network by creating an on-premises infrastructure, which can include servers, towers, RRUs, and various software, such as DUs. Private networks are supported, managed, and eventually upgraded or replaced by the organization. Since private clouds are typically owned by the organization, there is no sharing of infrastructure, no multitenancy issues, and zero latency for local applications and users. To connect to the private network, a user's device must be authenticated, such as by using a pre-authentication key, authentication software, authentication handshaking, and the like.

Public networks alleviate the responsibility for management of the infrastructure since they are by definition hosted by a public network provider such as AWS, Azure, or Google Cloud. In and infrastructure-as-a-service (IaaS) public network deployment, enterprise data and application code reside on the public network provider servers. Although the physical security of hyperscale public network providers such as AWS is unmatched, there is a shared responsibility model that requires organizations that subscribe to those public network services to ensure their applications and network are secure, for example by monitoring packets for malware or providing encryption of data at rest and in motion.

Public networks are shared, on-demand infrastructure and resources delivered by a third-party provider. In a public network deployment the organization utilizes one or more types of cloud services such as software-as-a-service (SaaS), platform-as-a-service (PaaS) or IaaS from public providers such as AWS or Azure, without relying to any degree on private cloud (on-premises) infrastructure.

A private network is a dedicated, on-demand infrastructure and resources that are owned by the user organization. Users may access private network resources over a private network or VPN; external users may access the organization's IT resources via a web interface over the public network. Operating a large datacenter as a private network can deliver many benefits of a public network, especially for large organizations.

In its simplest form, a private network is a service that is completely controlled by a single organization and not shared with other organizations, while a public network is a subscription service that is also offered to any and all customers who want similar services.

Regardless, because cellular networks are private networks run by a cellular provider, and the control of the kubernetes clusters and the control plane needs to be on a public network which has more processing power and space, the kubernetes clusters need to originate on the public network and extend or "stretch" to the private network.

Figure 5:
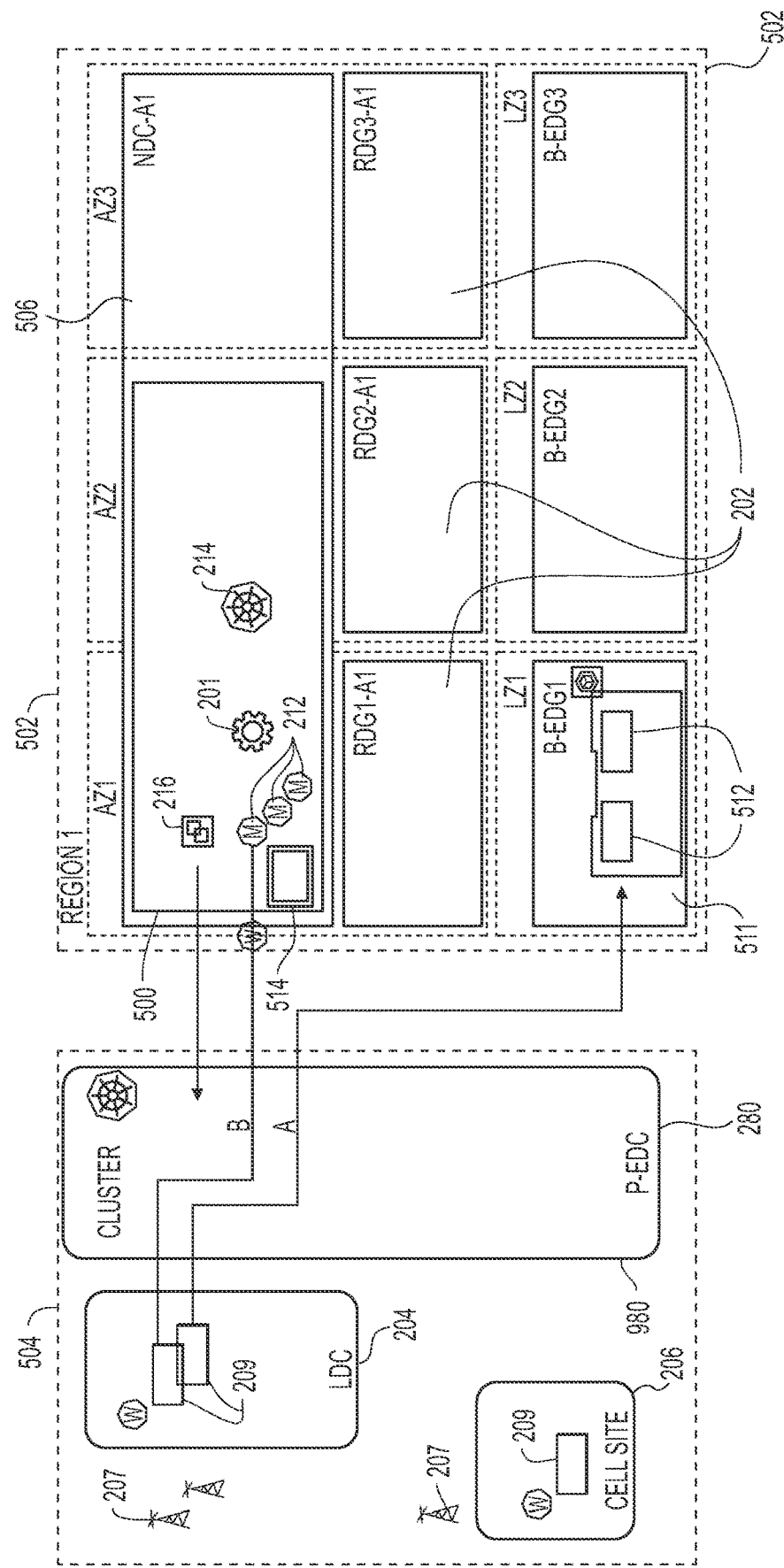
FIG. 5 illustrates a block diagram of stretching the kubernetes clusters from a public network to a private network, according to various embodiments.

FIG. 5 illustrates a block diagram of stretching the kubernetes clusters from a public network to a private network and across the availability zones, according to various embodiments.

This is done by the automation platform module 201 creating master modules 212 in the control plane 500 located within the public network 502. The kubernetes clusters are then created as explained above but are created in both private and public networks 502, 504.

The public network 502 shown in FIG. 5 shows that there are three availability zones AZ1, AZ2 and AZ3. These three availability zones AZ1, AZ2 and AZ3 are in three different geographical areas. For example, AZ1 may be in the western area of the US, AZ2 may be in the midwestern area of the US, and AZ3 may be in the east coast area of the US.

A national data center (NDC) 506 is shown as deployed over all three availability zones AZ1, AZ2 and AZ3 and the workloads will be distributed over these three availability zones AZ1, AZ2 and AZ3. It is noted that the NDC 506 is a logical creation of the data center instead of a physical creation over these zones. The NDC 506 is similar to the RDC 202 but instead of being regional, it is stretched nationally across all availability zones.

It is noted that the control plane 500 stretches across availability zones AZ1 and AZ2 but could be stretched over all three availability zones AZ1, AZ2 and AZ3. If one of the zones fails the control plane 500 would automatically be deployed on the other zone. For example, if zone AZ1 fails, the control plane 500 would automatically be deployed on AZ2. This is because each of the software programs which are deployed on one zone are also deployed in the other zone and are synced together so that when one zone fails, the duplicate started software automatically takes over. This creates significant stability.

Moreover, because the communication is to and from a private network, the communications between the public and private networks may be performed by pre-authorizing the modules on the public network to communicate with the private network.

The private network 504 includes the LDC 204 and cell sites 206 as well as an extended data center (EDC) 280. The LDC 204 and cell sites 206 interact with the EDC 280 as the EDC 280 acts a router for the private network 504. The EDC 280 is configured to have a concentration point where the private network 504 will extend from. All of the LDCs 204 and cell sites 206 connect to only the EDC 280 so that all of the communications to the private network 504 can be funneled through one point.

Figure 7:
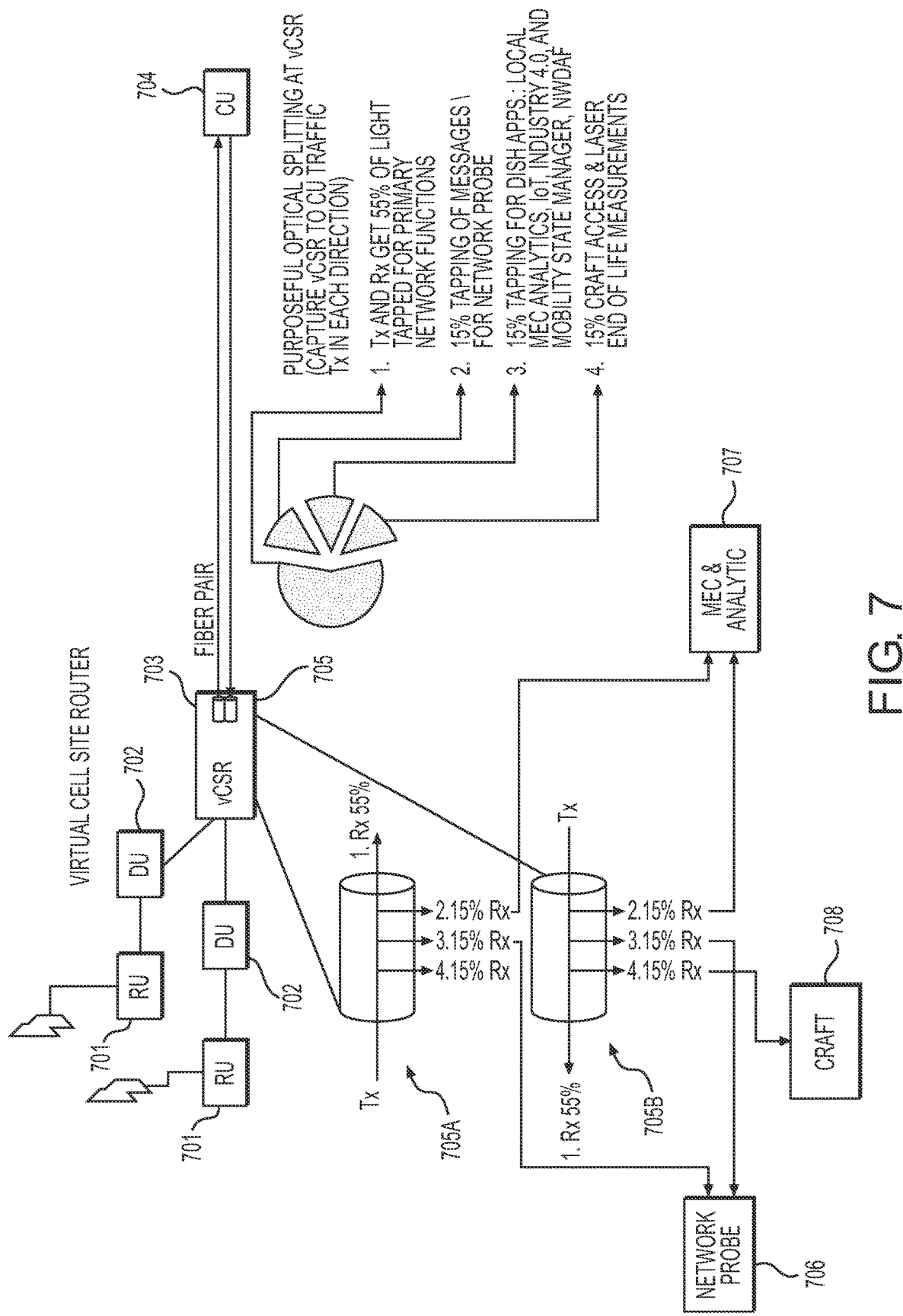
FIG. 7 illustrates a block diagram of an architecture of a telecommunications network.

The kubernetes master modules 212 control the DUs so that the clusters are properly allowing communications between the private network 504 and the public network 502. There are multiple master modules 212 so that if one master module fails, one of the other master modules takes over. For example, as shown in FIG. 7, there are three master modules 212 and all three are synced together so that if one fails, the other two are already synced together to automatically become the controlling master.

Each of the master modules 212 performs the functions of discussed above, including creating and managing the DUs (vDUs) 209. This control is shown over path B which extends from a master module 212 to each of the DUs 209. In this regard, the control and observability of the DUs 209 occurs only in the public network 502 and the DUs and the kubernetes clusters are in a private network 504.

There is also a module for supporting functions and PaaS (the support module 514). There are some supporting functions that are required for observability and this support module 514 will provide such functions. The support module 514 manages all of the DUs from an observability standpoint to ensure it is running properly and if there are any issues with the DUs, notifications will be provided. The support module 514 is provided on the public network 502 to monitor any of the DUs 209 across any of the availability zones.

The master modules 212 thus create and manage the kubernetes clusters and create the DUs 209 and the support module 514, and the support module 514 then supports the DUs 209. Once the DUs 209 are created, they run independently, but if a DU fails (as identified by the support module 514) then the master module 212 can restart the DU 209.

Once the software (e.g., clusters, DUs 209, support module 514, master module 212, etc.) is set up and running, the user voice and data communications received at the towers 207 and is sent over the path of communication A so that the voice and data communications is transmitted from tower 207, to a DU 209, and then to the CU 512 in a EKS cluster 511. This path of communication A is separate from the path of communication B for management of the DUs for creation and stability purposes.

Figure 6:
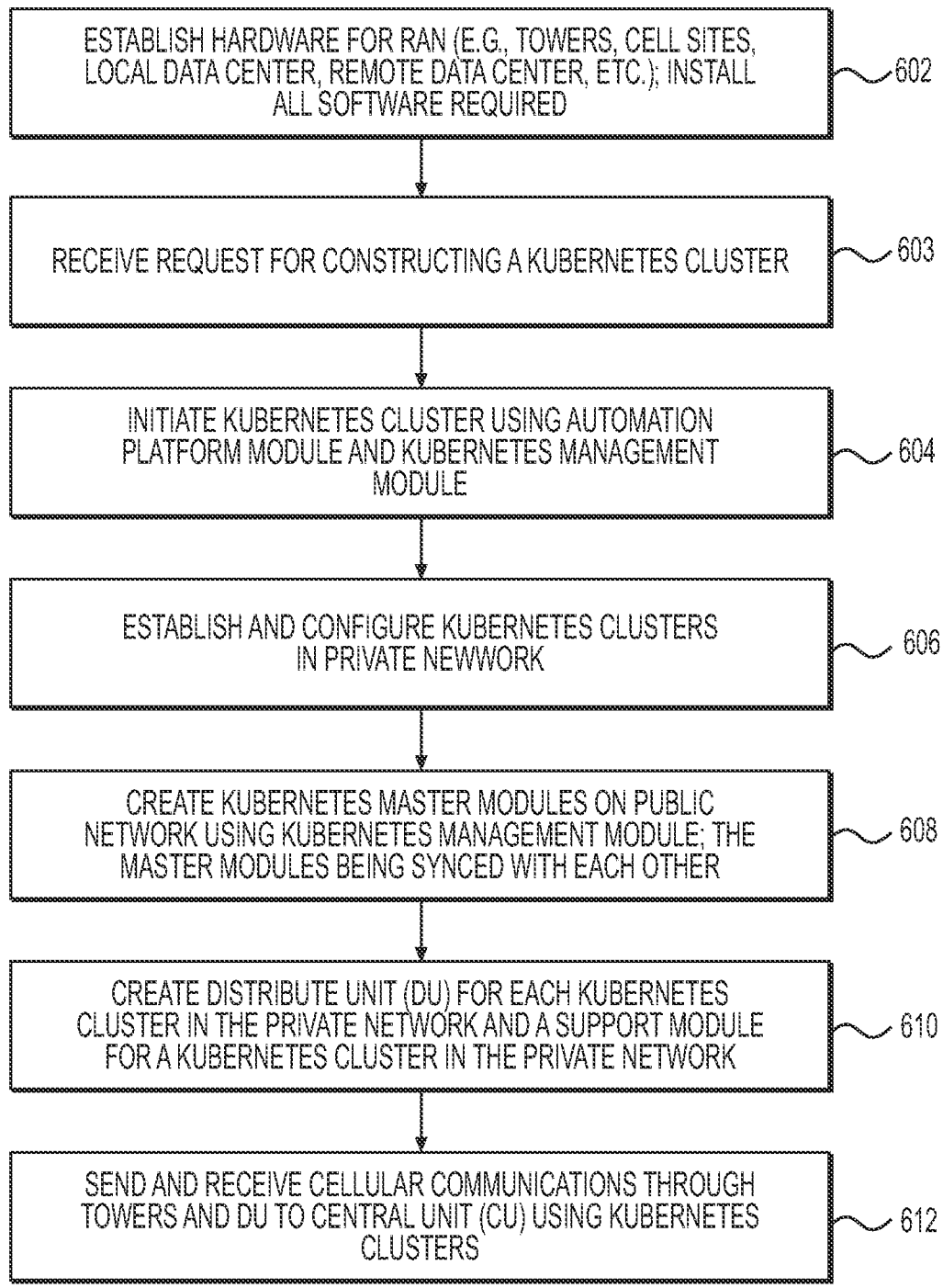
FIG. 6 illustrates a method of establishing cellular communications using kubernetes clusters stretched from a public network to a private network.

FIG. 6 illustrates a method of establishing cellular communications using kubernetes clusters stretched from a public network to a private network. Blocks 602, 603 and 604 of FIG. 6 are similar to Blocks 402, 403, and 404 of FIG. 4.

Block 606 of FIG. 6 is also similar to block 406 of FIG. 6 except that the kubernetes clusters will be established on the private network from the public network. The kubernetes clusters can also be established on the public network as well. To establish the kubernetes cluster on the private network, the private network allows a configuration module on the public network to access the private network servers and to install the kubernetes workers on the operating systems of the servers.

In block 608, kubernetes master modules are creates on the public network as explained above. One of the master modules controls the kubernetes workers on the private network. As discussed above, the master modules are all synced together.

In block 610, the DUs are created for each of the kubernetes clusters on the private network. This is accomplished by the active master module installing the DUs from the public network. The private network allows the active master module access to the private network for this purpose. Once the DUs are installed and configured to the RRUs and the corresponding towers, the DUs then can relay communications between the towers and the CU located on the public network.

Also in block 610, the support module is created on the public network and is created by the active master module. This support module provides the functions as established above and the private network allows access thereto for such support module to monitors each of the DUs on the private network.

Last, block 612 of FIG. 6 is similar to block 412 of FIG. 4. However, the communications proceed along path A in FIG. 5 as explained above and the management and monitoring of the DUs is performed along the kubernetes clusters along path B.

Split Light Signal Monitoring

With the above-described configuration, various points of the network architecture may allow for improved monitoring of particular aspects of the infrastructure. For example, when utilizing a 5G cloud-based infrastructure, or even an infrastructure of another type of cellular network which may or may not be hosted on a public cloud, the system of the instant embodiments may allow for observing of particular components within or outside of the cloud but within the cellular network architecture, information can be captured to ensure that the network host and/or wireless carrier can more easily remediate an issue with transmission (e.g., a call or message between two users), or otherwise proactively improve the network to avoid potential problems.

As shown in FIG. 7, the system may use and/or implement various components and/or units such as at least one radio unit (RU) 701, at least one distributed unit (DU) 702, and at least one central unit (CU) 704. The RU 701 is a radio hardware unit that coverts radio signals sent to and from an antenna (which may have originated from user equipment, or UE, such as a cellular phone) into a digital signal for transmission over packet networks. In some embodiments, the RU 701 is hosted and managed by the provider privately. The RU 701, DU 702 and CU 704 may have structural similarities or otherwise be the same as the RRU, vDU and vCU discussed with respect to FIG. 1.

The RU 701 will transmit the converted radio signal to the DU 702, which is generally deployed, hosted and managed by the provider privately. The DU 702 will then transmit an optical signal to a virtual cell cite router, or VCSR 703, which is an intermediary router that will allow for the signal to ultimately be optically transmitted to the CU 704. The CU 704 may include software and/or hardware that is at least partially hosted on a public cloud network.

In some embodiments, for example as shown in FIG. 7, there may be plural RUs 701, each respectively connected to one of plural DUs 702. The number of RUs and DUs are not necessarily limited, and are subject to the capacity of the provider's network. In some examples, there may exist at least two, at least five, at least 10, at least 20, or at least 50 RUs and DUs within the system.

The VCSR 703 receives the signal from the DU 702 (or combined signal in the case of multiple DUs 702) and transmits the signal as an optical signal to the CU 704.

In some embodiments, the VCSR 703 includes an optical splitter 705, which will split the optical signal received from the DU 702 before the signal reaches the CU 704. The optical splitter 705 may be a physical fiberoptic splitter structure. The optical splitter 705 can split, or separate, an incident light beam (e.g., a transmission or the optical signal) into several light beams at a certain ratio. The ratio may be a predetermined ratio as described later.

As shown in FIG. 7, the optical splitter 705 includes a first portion 705A that transmits a first part of the signal toward the CU 704. The optical splitter 705 may include structure to split the signal into the first part and at least a second part, where the second part is directed to some other module distinct from the CU 704. The optical splitter 705 may be provided within a dedicated port of the VCSR 703, or within one or more dedicated ports of the VCSR 703.

In some embodiments, the splitter includes a second portion 705B that transmits a signal from the CU 704 back toward the DUs 702. This signal may similarly be split into a first part and one or more second parts, the second part being directed to one or more other modules distinct from the CU 704.

For example, the optical splitter 705 may be configured as a fiber pair including the first portion 705A and the second portion 705B as respective fibers of the fiber pair. The transmission of at least some of the signal through the first portion 705A (e.g., one of the fiber pairs) may be in a first direction, and the transmission of at least some of the signal through the second portion 705B (e.g., the other of the fiber pairs) may be in a second direction. This may advantageously facilitate transmission and reception of signal on each path. In some embodiments, the first and second direction may be opposite to each other.

In some embodiments, an entirety of the second part is directed to a single remote module, such as a network probing module 706 shown in FIG. 7. However, in other embodiments, as shown in FIG. 7, the signal is split into a first part and a plurality of second parts, with the first part being directed to the CU 704 (in the case of downstream transmission for example using the one fiber such as first portion 705A) or to the DU 702 (in the case of upstream transmission as with the other fiber such as second portion 705B). One of the second parts are directed to one of a network probing module 706, a multi-access edge computing (MEC) and analytics module 707 (e.g., an analytic module), or a craft module, which may be a craft access and laser end of life module. A second one of the second parts would be directed to an other of the network probing module 706, the MEC and analytics module 707, or the craft access for such measurement as determining the operating laser's end of life within the module, and a third one of the second parts would be directed to an other of the network probing module 706, the MEC and analytics module 707, or the craft access such measurement as determining the operating laser's end of life within the module.

The network probing module 706 may be a module working within an observability framework (OBF) or otherwise to monitor particular aspects relating to the functionality of a network. The MEC infrastructure may be generally used by a network administrator in order to improve latency and ultimately reduce cost and reduce power consumption at other mobile network devices. Accordingly, the MEC and analytics module 707 may include a mobile edge computing module and seek to analyze particular aspects of a wireless transmission at a localized area, monitoring latency, data transmission or otherwise.

The craft access and laser end of life module may be a module overseen by a craft person such as network and/or communications engineer and/or a person contracted to repair aspects of the network. Other examples of a craft person may be a power engineer or another person whose job it is to handle particular errors or inefficiencies in hardware or software provided within the 5G network space, for example at any point within the RU 701, DU 702, VCSR 703, CU 704, or some other component.

Which modules each part of the optical signal receives, and how many modules receive parts of the optical signal is variable and is not to be limited by the diagram shown in FIG. 7. For example, the optical signal may be split into two parts, or three, or four, or more parts, and one or more of the network probing module 706, the MEC and analytics module 707, or the craft access and laser end of life determination may receive one or more of the split parts. In some embodiments, only one or two of the network probe module, the MEC and analytics module and the craft access and laser end of life determination module are present, and the optical signal is split accordingly.

Each of the network probing module 106, the MEC and analytics module 707, or the craft access and laser end of life module may include a hardware processor configured to receive the optical signal and to make computations and observations relating to the signal. Each of the network probing module 706, the MEC and analytics module 707, or the craft access and laser end of life determination module may include a memory such as a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing, configured to allow for storage of information relating to the received signal.

In some embodiments, the optical splitter 705 is provided in the port or in one or more ports on a relatively downstream side or at a downstream end/a downstream part (e.g., closer to the CU 104) of the VCSR 703. This may advantageously allow for the VCSR to properly route and combine signals in the case where multiple DUs 702 and RUs 701 are transmitting data to the VCSR 703. However, in some embodiments, the optical splitter 705 may also be in a relative center of the VCSR 703, or even at an upstream side (e.g., closer to the DUs 702) of the VCSR 703. This may be particularly advantageous given the two-way transmission within the system, particularly when data from the CU being transmitted toward the DUs needs to be appropriately routed by the VCSR 703 before splitting.

In some embodiments, the optical splitter 705 includes one or more of mirrors, prisms and lenses to allow for appropriate splitting of the optical signal. Each part of the split optical signal will contain 100% of the data provided from the DU (in a DU-CU direction) or from the CU (in a CU-DU direction), so as to allow for each module receiving the respective part of the optical signal to have an entirety of the data to be used for processing, observing or monitoring. That is, the data in each part will be the same data.

In some embodiments, the light spectrum can be used to separate data traffic types and use mirrors, prisms and lenses to separate that traffic during the splitting and transferring of optical signal. This may also include observability traffic, fault management, network redundancy synchronization and/or network recovery messaging.

In some embodiments, and as shown in FIG. 7, about 55% of the downstream optical signal is transmitted to the CU 104 by first portion 705A. In such an embodiment, about 15% of the optical signal is split and directed to the network probing module 706, about 15% of the optical signal is split and directed to the MEC and analytics module 707, and about 15% of the optical signal is split and directed to the craft access and laser end of life module 708. However, the amount of optical signal is not so limited. For example, in some embodiments, 60% of the optical signal may be transmitted to the CU 704, 20% to the network probing module and 20% to the MEC and analytics module, with the craft access and laser end of life module omitted. In other embodiments, about 50%, about 60% or about 40-70% of the optical signal may be transmitted to the CU 704, with about 0%-25% of the optical signal split and directed to each of the network probing module 706, MEC and analytics module 707 and craft access and laser end of life module 708. In any event, so long as an appropriate amount of signal is directed to the CU 704, and a sufficient amount of signal is directed to each of the modules being utilized for the particular system, the system of the instant embodiments can be favorably achieved.

In some embodiments, as discussed above and as shown in FIG. 7, the system may allow for two-way transmission, with an optical signal being transmitted from DU 702 to CU 704 through the VCSR 703, and another optical signal being transmitted from the CU 704 to the DU 702 through the VCSR 703. In this case, the optical splitter 705 amounts to a fiber pair including first portion 705A and second portion 705B, one portion allowing for downstream transmission and the other for upstream transmission. In such a case, the optical splitter 705 may allow for both the downstream and upstream optical signals to have parts split to the relevant modules. In some embodiments, a same amount of optical signal will be split during upstream transmission as during downstream transmission.

Thus, as a nonlimiting example shown in FIG. 7, about 55% of an upstream optical signal may be transmitted to the DU 702 by second portion 705B, with about 15% of the optical signal split and directed to the network probing module 706, about 15% of the optical signal split and directed to the MEC and analytics module 707, and about 15% of the optical signal split and directed to the craft access and laser end of life module 708. Similarly, about 55% of the upstream optical signal is transmitted to the CU 704 by first portion 705A, with about 15% of the optical signal split and directed to the network probing module 706, about 15% of the optical signal split and directed to the MEC and analytics module 707, and about 15% of the optical signal split and directed to the craft access and laser end of life module 708. However, the amount of optical signal is not so limited. For example, in some embodiments, 60% of the optical signal may be transmitted to the DU 702, 20% to the network probing module and 20% to the MEC and analytics module, with the craft access and laser end of life module omitted. In other embodiments, about 50%, about 60% or about 40-70% of the optical signal may be transmitted to the DU 702, with about 0%-25% of the optical signal split and directed to each of the network probing module 706, MEC and analytics module 707 and craft access and laser end of life module 708. In any event, so long as an appropriate amount of signal is directed to the DU 702, and a sufficient amount of signal is directed to each of the modules being utilized for the particular system, the system of the instant embodiments can be favorably achieved.

In some embodiments, an entirety of the data being transmitted through the optical signal is included in each of the first part and the second part or the plurality of second parts. Thus, the recipient module of any of the parts may receive an entirety of the data transmission, be it for observability, monitoring, or other data collection.

The above embodiments allow for purposeful optical splitting at the VCSR 703, for example at the edge of the VCSR 703. The transmission and reception between the DU 702 and CU 704 allow for a sufficient portion, such as about 50% or 55% or 60% of light to be tapped for primary network functions, with some portions being tapped for one or more of network probing, local MEC analytics, network analytics data function (NWDAF), craft access and laser end of life measurements and the like. Further, the optical splitting may allow for particulars of transmission data to be monitored or observed by multiple parties at convenient locations, with each party focusing on a particular aspect of the network and its functionality.

Figure 8:
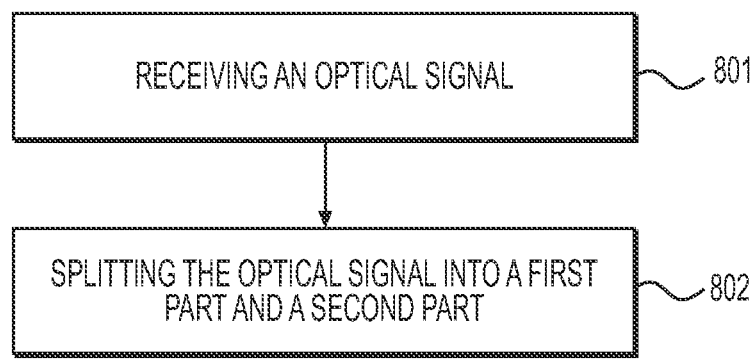
FIG. 8 illustrates a method of network probing according to some embodiments.

As shown in FIG. 8, some embodiments include a first step 801 of receiving an optical signal from a module. Such a module may be, for example, the DU 702 (in the case of downstream transmission) or the CU 704 (in the case of upstream transmission). The system then includes splitting the optical signal into a first part and a second part. The splitting may occur by means of the optical splitter 705 provided within the VCSR 703. Further, the first part of the signal is directed to a module providing primary network functions, and the second part of the signal is directed to an observability module. The module, which may be a component, providing primary network functions may be one or more of the DU 702, CU 704 and VCSR 703.

Figure 9:
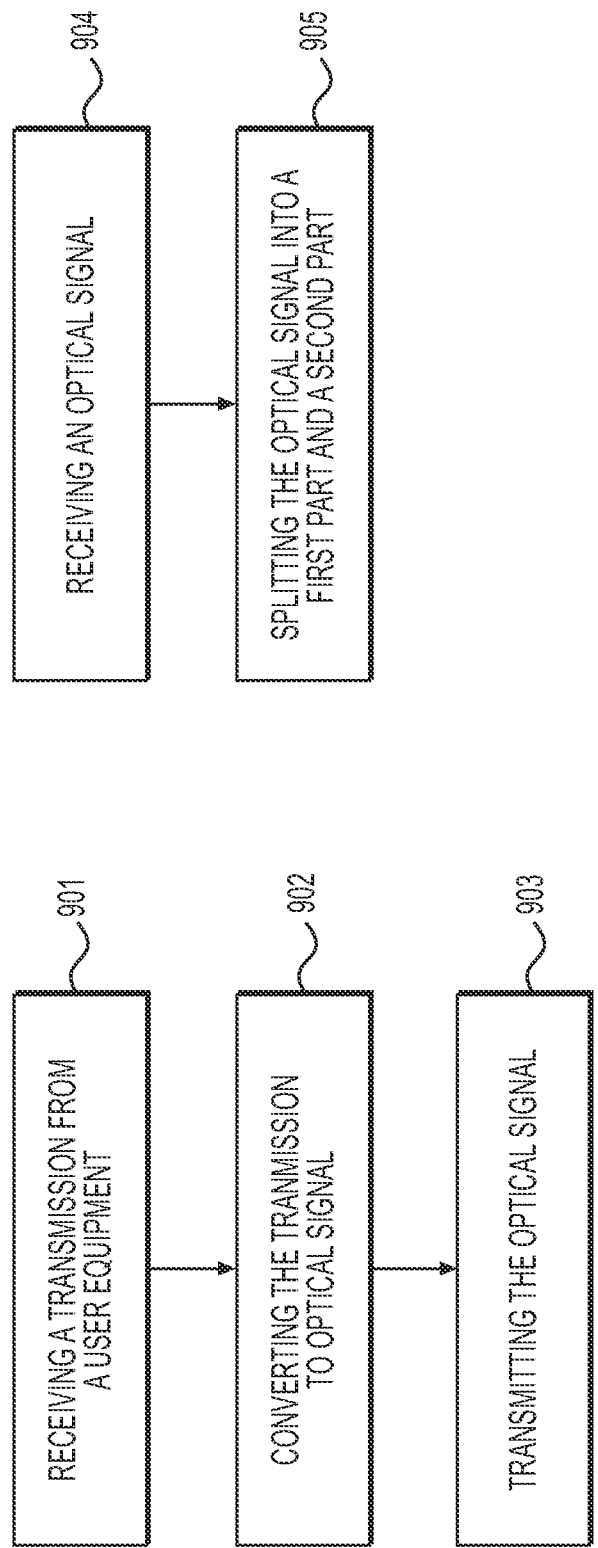
FIG. 9 illustrates a method of transmitting data according to some embodiments.

As shown in FIG. 9, some embodiments may also include a step 901 of receiving a transmission from user equipment. This transmission may be, for example, a portion of a phone conversation using a cellular network such as a 5G network, or a text (SMS) message or a data message or other type of data transmission. After the transmission is received, the method may include a step 902 of converting the transmission to an optical signal. The conversion may occur at or within hardware or software of the RU (e.g., RU 701) or within the hardware or software of the DU (e.g., DU 702). The optical signal may then proceed, via a step 903, to a first module, which may be the DU 702, the CU 704, or some other component. Then, steps 904 and 905, which correspond to steps 801 and 802 in FIG. 8, may occur.

In some embodiments, steps 801 and 802 (and similarly steps 904 and 905) are performed by or within the VCSR 703, e.g., within hardware and/or software provided within the VCSR 703. In other embodiments, the methods may be performed within a controller, such as a hardware processor, that instructs the VCSR 703 or other component to receive the optical signal and perform the splitting. Steps 901-903 may be performed at other locations within the network architecture, such as within the RU 701, the DU 702, the VCSR 703, the CU 704 or some combination thereof.

As mentioned above, various embodiments provide an optical splitter in a cellular network. In one embodiment, the cellular network runs kubernetes clusters along with a radio access network ("RAN") to coordinate workloads in the cellular network, such as a 5G cellular network described with respect to FIGS. 1-6.

Broadly speaking, embodiments of the present application provide methods, apparatuses and computer implemented systems for configuring an optical splitter in a 5G cellular network using servers at cell sites, cellular towers and kubernetes clusters that stretch from a public network to a private network, the network described with reference to FIGS. 1-6.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A virtual cell site router, comprising:
    a first input configured to receive first optical signals that include information destined for user equipment devices that are subscribed to a cellular communication service provided by a cellular network, wherein the first optical signals are received from a central unit of the cellular network that is hosted in a public cloud network controlled by a public cloud network provider;
    a second input configured to receive second optical signals from a distributed unit of the cellular network, wherein the distributed unit receives the second optical signals from a radio unit of the cellular network, and wherein the radio unit and the distributed unit are hosted in a private network controlled by a provider of the cellular communication service;
    a first output configured to transmit optical signals to the distributed unit of the cellular network;
    a second output configured to transmit optical signals to the central unit of the cellular network;
    a third output configured to transmit optical signals to a first computing device that is separate from the virtual cell site router, the distributed unit, the radio unit, and the central unit;
    a fourth output configured to transmit optical signals to a second computing device that is separate from the virtual cell site router, the distributed unit, the radio unit, and the central unit; and
    an optical splitter that includes:

a first portion configured to:
　split a first optical signal received from the central unit via the first input into a first part and one or more second parts;
　direct the first part of the first optical signal to the distributed unit via the first output; and
　direct a second part of the one or more second parts of the first optical signal to the first computing device via the third output; and
a second portion configured to:
　split a second optical signal received from the distributed unit via the second input into a first part and one or more second parts;
　direct the first part of the second optical signal to the central unit via the second output; and
　direct a second part of the one or more second parts of the second optical signal to the second computing device via the fourth output.

2. The virtual cell site router according to claim 1, wherein the one or more second parts of the first optical signal received from the central unit comprise a plurality of second parts of the first optical signal, the first computing device comprises a plurality of computing devices, and each second part of the plurality of second parts of the first optical signal is directed toward a different computing device of the plurality of computing devices.

3. The virtual cell site router of claim 1, wherein the first computing device and the second computing device are separate computing devices.

4. A system, comprising:
at least one radio unit in a cellular network, wherein the at least one radio unit is hosted in a private network controlled by a provider of a cellular communication service;
at least one distributed unit configured to receive an optical signal from the at least one radio unit and provide the optical signal to a virtual cell site router, wherein the at least one distributed unit is hosted in the private network;
the virtual cell site router that includes:
　a first input configured to receive first optical signals that include information destined for user equipment devices that are subscribed to the cellular communication service provided by the cellular network, wherein the first optical signals are received from a central unit of the cellular network that is hosted in a public cloud network controlled by a public cloud network provider;
　a second input configured to receive second optical signals from the at least one distributed unit of the cellular network, wherein the at least one distributed unit receives the second optical signals from the at least one radio unit of the cellular network;
　a first output configured to transmit optical signals to the at least one distributed unit of the cellular network;
　a second output configured to transmit optical signals to the central unit of the cellular network;
　a third output configured to transmit optical signals to a first observability computing device that is separate from the virtual cell site router, the central unit, the at least one radio unit, and the at least one distributed unit; and
　a fourth output configured to transmit optical signals to a second observability computing device that is separate from the virtual cell site router, the central unit, the at least one radio unit, the at least one distributed unit, and the first observability computing device; and
an optical splitter, wherein the optical splitter is configured to:
　receive the optical signal from the at least one distributed unit of the cellular network;
　split the optical signal into a first part and a plurality of second parts;
　direct, via the second output, the first part of the optical signal to the central unit of the cellular network;
　direct, via the third output, a first part of the plurality of second parts to the first observability computing device; and
　direct, via the fourth output, a second part of the plurality of second parts to the second observability computing device configured to monitor an aspect of the cellular network.

5. The system according to claim 4, wherein:
the at least one radio unit includes a plurality of radio units,
the at least one distributed unit includes a plurality of distributed units,
each distributed unit receives a signal from a corresponding radio unit,
and each distributed unit transmits the signal to the virtual cell site router.

6. The system according to claim 4, wherein the optical splitter comprises:
a first fiber configured to allow transmission of the optical signal from the distributed unit to the central unit; and
a second fiber configured to allow transmission of the optical signal from the central unit to the distributed unit.

7. The system according to claim 4, wherein the first observability computing device is a network probing computing device and the second observability computing device is an analytic computing device.

8. The system according to claim 7, wherein data carried in the first part and each of the plurality of second parts are a same data.

9. The system according to claim 7, further comprising a third observability computing device, wherein the optical splitter is configured to direct a third one of the plurality of second parts to the third observability computing device.

10. A method for probing a cellular network, comprising:
receiving an optical signal that includes information destined for a user equipment device that is subscribed to a cellular communication service provided by the cellular network, wherein the optical signal is received via a central unit of the cellular network that is hosted in a public cloud network controlled by a public cloud network provider;
splitting the optical signal into a first part and one or more second parts using an optical splitter of a virtual cell site router;
directing the first part of the optical signal to a radio unit of the cellular network via a distributed unit of the cellular network, wherein the radio unit and the distributed unit are hosted in a private network controlled by a provider of the cellular communication service; and
directing at least one of the one or more second parts of the optical signal to an observability computing device that is separate from the virtual cell site router, the radio unit, the distributed unit, and the central unit.

11. The method according to claim 10, wherein directing the first part of the optical signal comprises:
> converting the optical signal into a transmission to be transmitted to the user equipment device via a 5G network; and
> transmitting the transmission to the user equipment device via the 5G network.

12. The method according to claim 11, wherein converting the optical signal into the transmission comprises:
> converting the optical signal into the transmission at the distributed unit of the cellular network.

13. The method according to claim 10, wherein the one or more second parts is a plurality of second parts, the method further comprising:
> directing a second part of the plurality of second parts to at least one of a network probing computing device or an analytic computing device.

\* \* \* \* \*